(No Model.)
W. G. TOEPFER, Dec'd.
A. TOEPFER, Administratrix.
BICYCLE BELL.
No. 605,936. Patented June 21, 1898.
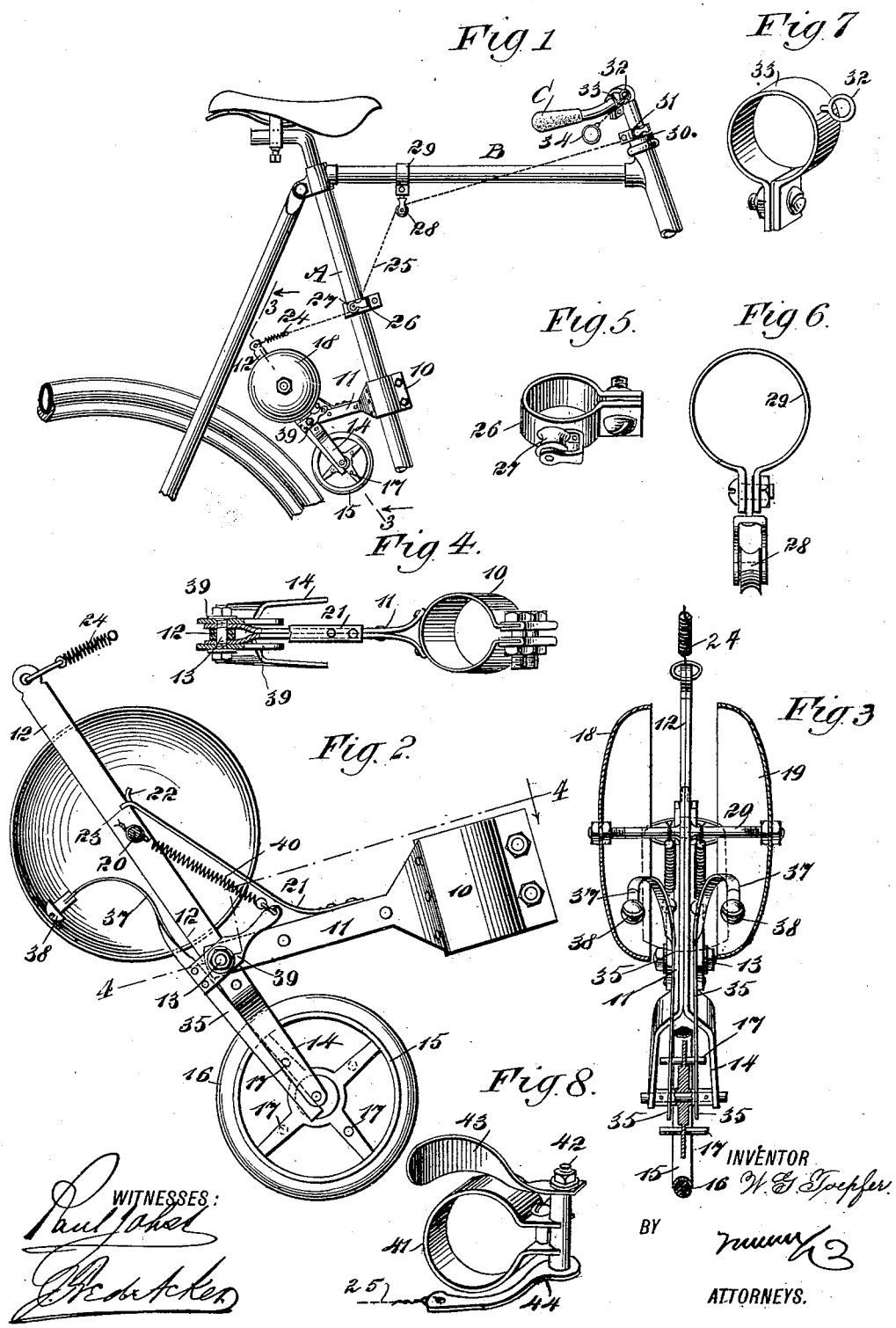

UNITED STATES PATENT OFFICE.

WILLIAM G. TOEPFER, OF NEW YORK, N. Y., ASSIGNOR TO HIMSELF AND ELLA M. SANGER, OF SAME PLACE; ANTOINETTE TOEPFER ADMINISTRATRIX OF SAID WILLIAM G. TOEPFER, DECEASED.

BICYCLE-BELL.

SPECIFICATION forming part of Letters Patent No. 605,936, dated June 21, 1898.

Application filed December 30, 1896. Serial No. 617,479. (No model.)

*To all whom it may concern:*

Be it known that I, WILLIAM G. TOEPFER, of New York city, in the county and State of New York, have invented a new and useful Improvement in Bicycle-Bells, of which the following is a full, clear, and exact description.

The object of the invention is to construct a bicycle-bell adapted to be attached to the frame of a bicycle and operated from one of the supporting-wheels, the trip of the bell being brought into operation by the manipulation of a shifting device located at the handle-bar or a point on the frame convenient to the same.

A further object of the invention is to construct the bicycle-bell with two gongs alternately operated by a single trip-wheel, which trip-wheel, as above intimated, is operated by a supporting-wheel of the machine.

A further object of the invention is to provide a bell of the character above set forth which will be simple, durable, and economic in its construction.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of the device applied to a bicycle-frame. Fig. 2 is an enlarged vertical section through the alarm device, drawn on a large scale. Fig. 3 is an enlarged vertical section through the gong and through the trip-wheel, essentially on the line 3 3 in Fig. 1. Fig. 4 is a horizontal section on the line 4 4 of Fig. 2. Fig. 5 is a perspective view of a guide-clip adapted for attachment to the center brace of the frame of the machine and in duplicate to the stem of the front fork. Fig. 6 is a side elevation of a guide device adapted for attachment to the upper brace of the frame. Fig. 7 is a perspective view of a guide device adapted for attachment to the handle-bar of the machine, and Fig. 8 is a perspective view of a trip device adapted for attachment to the handle-bar and which may be used instead of the device shown in Fig. 7.

A clip 10 is provided for attachment to the center brace A of the frame of the bicycle. An arm 11 is rearwardly projected from the clip in direction of the rear wheel of the bicycle. The arm 11 is bifurcated at its rear extremity, as shown particularly in Fig. 4, and receives between the members of its bifurcated portion a rocking arm 12. This arm extends beyond the top and the bottom of the clip-arm 11, and the lower end of the rocking arm 12 is bifurcated, as shown at 14 in the drawings. In the bifurcated portion of the rocking arm 12 a trip-wheel 15 is journaled, the said trip-wheel being preferably provided with a rubber tire 16 or a tire of like character.

At each side of the trip-wheel a series of pins 17 is circularly grouped, the pins of opposite sides being alternately arranged. The trip-wheel 15 is adapted to be brought into contact with the tire of the rear wheel of the bicycle and receives motion therefrom.

Two gongs 18 and 19 are employed. These gongs are brought face to face, yet are separated a predetermined distance apart, as shown in Fig. 3, so that each gong may act independently. The gongs are attached to a shaft 20, which is carried through and is secured to the upper portion of the rocking arm 12. A spring 21 is attached to the clip-arm 11 adjacent to the clip, and the said spring is carried upward and rearward and is cut or so formed at its upper end as to produce a forwardly-curved tongue 22, which is in sliding engagement with the forward edge of the rocking arm 12, while lateral ears 23 are likewise formed, which are in sliding engagement with the sides of the aforesaid rocking arm. The function of the spring 21 is to hold the trip-wheel 15 out of engagement with the tire of the rear wheel of the bicycle.

The trip-wheel 15 is brought in engagement with the rear wheel of the bicycle by operating a connection with the rocking arm at the handle-bar C of the machine. This engagement is preferably accomplished by attaching to the upper extremity of the rocking arm 12 a spring 24 and securing to the spring one end of a cord or chain 25, which cord or chain is passed over a friction-roller 27, located at one side of a collar 26, which collar is clipped or otherwise secured upon the center brace A of the frame above the main clip 10, as illustrated particularly in Fig. 1, the collar being shown in detail in Fig. 5. The cord or chain 25 is carried from the collar 26 upward and over a roller 28, which is swiveled to a collar 29, the said collar being attached in any suitable or approved manner upon the upper brace B of the aforesaid bicycle-frame. The cord or chain 25 is carried from the guide-roller 28 forwardly over a guide-roller 30, attached to the collar 31, which collar is secured upon the shank of the front fork of the machine, the collar 31 being preferably of the same construction as the collar 26, heretofore referred to. After the chain or cord 25 has passed over the guide-pulley 30 it is preferably conducted through an eye 32, which is formed upon or attached to a collar 33, the latter collar, which is shown in detail in Fig. 7, being secured upon the handle-bar C, as illustrated in Fig. 1; and after the cord or chain has passed through the eye 32 it is usually secured to a ring 34, as shown in Fig. 1, and this ring is slipped over a finger of the right hand of the rider, so that by drawing rearwardly on the cord or chain 25 the rocking arm will be carried at its lower or bifurcated end in a rearwardly direction sufficiently far to bring the trip-wheel 15 in engagement with the tire of the rear wheel of the machine.

A striking-arm 35 is provided for each gong, and each striking-arm is curved at its upper end 37 in a rearwardly direction and terminates in a clapper or a head 38, arranged for engagement with the gong to which the arm belongs. Each striking-arm 35 is secured upon the rear end of a lever 39, and both of these levers are fulcrumed on the pivot-pin 13, which is passed through the bifurcated end of the clamping-arm 11 and which serves to fulcrum the rocking arm 12. The forward end of each lever 39 has one end of a spring 40 attached thereto, the opposite end of the spring being carried upward and secured to the shaft or post 20, upon which the gongs are secured.

In the operation of the device when the chain or cord 25 is drawn rearward and the trip-wheel is brought to a contact with the periphery of the rear or driving wheel of the machine the rotation of the trip-wheel will cause its pins 17 to alternately engage with the striking-arm 35 and produce an alarm, and if the machine is traveling rapidly the alarm will be practically continuous as long as the trip-wheel remains in engagement with the rear or driving wheel of the machine. When the alarm is not needed, by permitting the chain or cord 25 to slacken the spring 21 will act to force the trip-wheel from the driving-wheel of the machine.

In Fig. 8 I have illustrated a device for controlling the movement of the trip-wheel in direction of the driving-wheel of the machine, and this device consists of a sleeve or collar 41, which is intended to be secured on the handle-bar of the machine, and this collar or sleeve carries a spindle 42, mounted to turn, and a hand-lever 43 is attached to the upper end of the spindle, while a shifting-lever 44 is secured to the lower end of the lever, and by moving the hand or thumb lever 43 in a predetermined direction the shifting-lever will be moved in a manner to draw the upper end of the rocking arm in a forwardly direction, bringing the trip-wheel 15 in engagement with the rear or driving wheel of the machine.

Having thus described my invention, I claim as new and desire to secure by Letters Patent—

1. In a bicycle-bell, a rocking support, a gong attached to said support, a trip-wheel carried by said support and adapted for engagement with a supporting or driving wheel of the bicycle, means for carrying the trip-wheel into engagement with the bicycle-wheel, a striking-arm for the gong, and a spring-actuated lever fulcrumed upon the pivot of the said rocking support and connected with the said striking-arm, the trip-wheel serving to operate the said striking-arm, substantially as described.

2. In a bicycle-bell, a rocking support, a gong attached to said rocking support at one side of its pivot-point, a trip-wheel carried by said support at the opposite side of the pivot-point and adapted to operate by engagement with a wheel of the bicycle, a striking-arm for the gong, and a spring-actuated lever fulcrumed upon the pivot of the said rocking support and connected with the said striking-arm, the striking-arm of the gong being operated by the said trip-wheel, as and for the purpose set forth.

3. In a bicycle-bell, a rocking support adapted for attachment to the frame of a bicycle, gongs attached to opposite sides of the said support, a trip-wheel carried by the said support and adapted for engagement with a wheel of the bicycle, a striking-arm for each gong, levers connected with the striking-arms and fulcrumed on the pivot of the said rocking support, springs connected with the levers and with a fixed support and controlling the movement of the striking-arms, and trip devices carried by the trip-wheel at opposite sides thereof and extending into the paths of the said striking-arms and arranged to operate the latter in one direction, as and for the purpose specified.

4. In a bicycle-bell, a rocking support, gongs attached to opposite sides of said support and facing each other, the said gongs being spaced apart a predetermined distance, a trip-wheel carried by said support and adapted for engagement with the tire of a bicycle-wheel, a spring having sliding engagement with the said rocking support and normally holding said trip-wheel out of engagement with the tire, and pivoted and spring-actuated striking-arms for the said gongs the said striking-arms being fulcrumed upon the pivot of the said rocking support and having their lower ends extending at opposite sides of the trip-wheel, the striking-arms being operated alternately from the said trip-wheel, as and for the purpose specified.

5. In a bicycle-bell a rocking support, a gong attached to said support, a trip-wheel carried by said support and adapted to operate by engagement with a supporting or driving wheel of the bicycle, and a spring-actuated striking-arm for the gong fulcrumed upon the pivot of the said rocking support and adapted to be operated from the said trip-wheel, substantially as described.

6. A bicycle-bell, consisting of a support, a clip adapted to be secured to the frame of a bicycle and having a rearwardly-extending bifurcated arm to which the said support is pivoted, gongs attached to opposite sides of the said support, a trip-wheel journaled at the lower end of the said support, hammers for the gongs extending at opposite sides of the said trip-wheel and adapted to be actuated thereby, spring-controlled levers connected with the said hammers and fulcrumed on the pivot of the said support, and means for moving the said support to carry the trip-wheel to and from the bicycle-wheel, as and for the purpose specified.

7. A bicycle-bell, consisting of a rocking support arranged for attachment to a bicycle-frame, the said rocking support having a bifurcated lower end, gongs attached to opposite sides of the said rocking support, a trip-wheel journaled between the members of the bifurcated portion of the said rocking support and adapted to engage with the periphery of a bicycle-wheel, hammers for the gongs extending at opposite sides of the said trip-wheel and adapted to be actuated thereby, spring-controlled levers connected with the said hammers, and fulcrumed on the pivot of the said rocking support, and means for moving the trip-wheel to and from the bicycle-wheel, as and for the purpose specified.

8. In a bicycle-bell, a rocking support, a gong attached to said support, a trip-wheel carried by said support and adapted for engagement with a supporting or driving wheel of the bicycle, a shifting device, means for attaching the shifting device to the handle-bar of the machine, a connection between the said shifting device and the said rocking support, and a spring-actuated striking-arm for the gong fulcrumed upon the pivot of the said rocking support and adapted to be operated from the said trip-wheel, substantially as described.

9. The combination with an adjustable clamp adapted for attachment to a bicycle-frame and having a rearwardly-extending arm, a rocking support pivoted to the said arm, a spring controlling the movement of the support in one direction, gongs carried by the said rocking support at opposite sides thereof and facing each other, a trip-wheel also carried by the said rocking support and arranged for engagement with the periphery of a bicycle-wheel, the said trip-wheel being provided with pins projecting from opposite sides, and striking-arms for the gongs fulcrumed upon the pivot of the said rocking support and having their lower ends extending at opposite sides of the trip-wheel, the said striking-arms being operated alternately from the said trip-wheel, of a shifting device, means for attaching the shifting device to the handle-bar of the machine, and a flexible connection between the shifting device and the said rocking support as and for the purpose set forth.

10. In a bicycle-bell, a rocking support, a gong attached to said support, a trip-wheel carried by said support and adapted for engagement with a supporting or driving wheel of the bicycle, means for moving said trip-wheel into and out of engagement with the bicycle-wheel, and a spring-actuated striking-arm for the gong fulcrumed upon the pivot of the said rocking support and having a head at one end, the other end of said arm extending at the side of the trip-wheel and adapted to be engaged by a trip device carried by said trip-wheel, substantially as described.

WILLIAM G. TOEPFER.

Witnesses:
WILLIAM NASCHOLD,
ANTOINETTE TOEPFER.